(12) United States Patent
Au et al.

(10) Patent No.: US 9,250,730 B2
(45) Date of Patent: Feb. 2, 2016

(54) TARGET ACQUISITION SYSTEM FOR USE IN TOUCH SCREEN GRAPHICAL INTERFACE

(71) Applicant: City University of Hong Kong, Hong Kong (CN)

(72) Inventors: Kin Chung Au, Hong Kong (CN); Xiaojun Su, Hong Kong (CN); Wing Hung Rynson Lau, Hong Kong (CN)

(73) Assignee: CITY UNIVERSITY OF HONG KONG, Hong Kong (HK)

( * ) Notice: Subject to any disclaimer, the term of this patent is extended or adjusted under 35 U.S.C. 154(b) by 39 days.

(21) Appl. No.: 14/218,154

(22) Filed: Mar. 18, 2014

(65) Prior Publication Data

US 2015/0268744 A1    Sep. 24, 2015

(51) Int. Cl.
*G06F 3/041* (2006.01)
*G06F 3/0484* (2013.01)
*G06F 3/0482* (2013.01)

(52) U.S. Cl.
CPC .............. *G06F 3/041* (2013.01); *G06F 3/0482* (2013.01); *G06F 3/04845* (2013.01)

(58) Field of Classification Search
CPC ........................................ G06F 3/041–3/04886
See application file for complete search history.

(56) References Cited

U.S. PATENT DOCUMENTS

| | | | |
|---|---|---|---|
| 8,259,136 B2 * | 9/2012 | Kim et al. ...................... | 345/660 |
| 2003/0085881 A1 * | 5/2003 | Bosma et al. .................. | 345/173 |
| 2005/0200611 A1 * | 9/2005 | Goto et al. ..................... | 345/173 |
| 2008/0235627 A1 * | 9/2008 | Torning et al. ................. | 715/841 |
| 2010/0295793 A1 * | 11/2010 | Srinivasan et al. ............. | 345/173 |
| 2012/0056814 A1 * | 3/2012 | Sudo ............................... | 345/168 |
| 2012/0254747 A1 * | 10/2012 | Bocirnea ........................ | 715/702 |
| 2014/0173484 A1 * | 6/2014 | Hicks .............................. | 715/769 |
| 2015/0040074 A1 * | 2/2015 | Hofmann et al. ............... | 715/852 |

OTHER PUBLICATIONS

Par-Anders Albinsson et al., High Prevision Touch Screen Interaction, CHI, Ft. Lauderdale, Florida, USA (2003).
Patrick Baudisch et al., Starburst: A Target Expansion Algorithm for Non-Uniform Target Distributions, Microsoft Research (2008).
Hrvoje Benko et al., Precise Selection Techniques for Multi-Touch Screens, CHI, Montreal, Quebec, Canada (2006).
Xiaojun Bi et al., FFitts Law: Modeling Finger Touch with Fitts' Law, CHI, Paris, France (2013).

(Continued)

*Primary Examiner* — Sanjiv D Patel
(74) *Attorney, Agent, or Firm* — Heslin Rothenberg Farley & Mesiti P.C.; Melvin S. Li, Esq.

(57) ABSTRACT

The present invention is concerned is a target acquisition system for use in touch screen graphical user interface for selecting a desired target from a plurality of potential selectable targets, comprising means for defining a local region of interest (ROI) of predefined shape and area; means for, on contact of a finger of a user on the touch screen, allowing activation of the ROI; means for ordering the potential selectable targets within the ROI into a one-dimensional (1-D) ordered list; means for mapping movement of the finger on the touch screen; and means for selection of the desired target from the plurality of potential selectable targets. The system is configured to allow operation of the defining in step a), the activation in step b), the ordering in step c), the mapping in step d) and the selection in step e) in a single touch action.

24 Claims, 5 Drawing Sheets

(56) References Cited

OTHER PUBLICATIONS

Renaud Blanca et al., Semantic Pointing: Improving Target Acquisition with Control-Display Ratio Adaptation, CHI, Vienna, Austria (2004).
Olivier Chapuis et al., DynaSpot: Speed-Dependent Area Cursor, CHI, Boston, Massachusetts, USA (2009).
Jean-Daniel Fekete et al., Excentric Labeling: Dynamic Neighborhood Labeling for Data Visualization, IBM through the Shared University Research (SUR) program and NASA (1998).
Leah Findlater et al., Enhanced Area Cursors: Reducing Fine Pointing Demands for People with Motor Impairments, UIST, New York, New York USA (2010).
Tovi Grossman et al., The Bubble Cursor: Enhancing Target Acquisition by Dynamic Resizing of the Cursor's Activation Area, CHI, Portland, Oregon USA (2005).
Carl Gutwin, Improving Focus Targeting in Interactive Fisheye Views, Department of Computer Science, University of Saskatchewan, (2002).
Amy K Karlson et al., ThumbSpace: Generalized One-Handed Input for Touchscreen-Based Mobile Devices, Human-Computer Interaction Lab, Department of Computer Science, University of Maryland, (2007).
Dominik Kaser et al., FingerGlass: Efficient Multiscale Interaction on Multitouch Screens, CHI, Vancouver, BC, Canada (2011).
Regis Kopper et al., Rapid and Accurate 3D Selection by Progressive Refinement, Deptment of Computer Science and Center for Human-Computer Interaction, Virginia Tech, (2011).
Tomer Moscovich, Contact Area Interaction with Sliding Widgets, UIST, Victoria, BC, Canada (2009).
Tomer Moscovich et al., Multi-Finger Cursor Techniques, Department of Computer Science, Brown University, (2006).
Alex Olwal et al., Rubbing and Tapping for Precise and Rapid Selection on Touch-Screen Displays, CHI, Florence, Italy (2008).
Pekka Parhi et al., Target Size Study of One-Handed Thumb Use on Small Touchscreen Devices, Mobile HCI, Helsinki, Finland (2006).
J. Karen Parker et al., Tractor Beam Selection Aids: Improving Target Acquisition for Pointing Input on Tabletop Displays, (2005).
Emmanuel Pietriga et al., Sigma Lenses: Focus-Context Transitions Combining Space, Time and Translucence, CHI, Florence, Italy, (2008).
Richard L. Potter et al., Improving the Accuracy of Touch Screens: An Experimental Evaluation of Three Strategies, CHI (1988).
Anne Roudaut et al., TapTap and MagStick: Improving One-Handed Target Acquisition on Small Touch-Screens, AVI, Napoli, Italy (2008).
Andrew Sears et al., High Prevision Touchscreens: Design Strategies and Comparisons with a Mouse, Department of Computer Science, Human-Computer Interaction Laboratory, University of Maryland, (1991).
Daniel Vogel et al., Shift: A Technique for Operating Pen-Based Interfaces Using Touch, CHI, San Jose, California USA (2007).
Aileen Worden et al., Making Computers Easier for Older Adults to Use: Area Cursors and Sticky Icons, CHI, Atlanta, Georgia USA (1997).
Koji Yatani et al., Escape: A Target Selection Technique Using Visually-cued Gestures, CHI, Florence, Italy (2008).

\* cited by examiner

TARGET ACQUISITION SYSTEM FOR USE IN TOUCH SCREEN GRAPHICAL INTERFACE

FIELD OF THE INVENTION

The present invention is concerned with a target acquisition (or pointing) system for use in the touch screen graphical interface of computers or mobile devices, such as smartphones and tablet computers.

BACKGROUND OF THE INVENTION

Touch input is increasingly popular in the past decade due to the popularity of mobile devices, such as smartphones and tablet computers. Although it is extremely convenient and intuitive to use our finger to interact with such devices as an input mechanism in place of a conventional mouse, it has one limitation. Human fingers have considerably large fingertip size, commonly referred to as the "fat finger" problem, making it a challenging task for at least some users to acquire small targets from dense target clusters due to two difficulties. First, the fat fingertip problem leads to low input precision. Second, it causes occlusion during target acquisition tasks. These two difficulties are particularly obvious when the screen size of the device is small.

The present invention seeks to overcome the aforementioned problem, or at least to provide a useful alternative to the public.

SUMMARY OF THE INVENTION

According to an aspect of the present invention, there is provided a target acquisition system for use in touch screen graphical user interface for selecting a desired target from a plurality of potential selectable targets, comprising a) means for defining a local region of interest (ROI) of predefined shape and area, b) means for, on contact of a finger of a user on the touch screen, allowing activation of the ROI, c) means for ordering the potential selectable targets within the ROI into a one-dimensional (1-D) order list, d) means for mapping movement of the finger on the touch screen, and e) means for selecting the desired target from the plurality of potential selectable targets, wherein the system is configured to allow operation of the defining in step a), the activation in step b), the ordering in step c), the mapping in step d), and the selection in step e) in a single touch action. The ordering of the potential selectable targets within the local region into a one-dimensional (1-D) order list allows focusing the targets in a sequential order. By a single touch action, it means that the action requires the finger to continuously stay in contact on the screen during a particular task. An action of contacting the screen with a fingertip and then dragging the fingertip across a distance is a single touch action; a double tapping on the screen with a fingertip is not a single touch action.

Preferably, the system may comprise means, activation of which is triggered by the finger contacting the touch screen and dragging the finger on the touch screen.

The local region may be defined by a first touch point by the finger. The first touch point is a reference point of the ROI. The ROI may contain the plurality of potential selectable targets, and the potential selectable targets are visual elements in any location on the touch screen. The reference point may be the center of the local region.

In an embodiment, size of the ROI may be determined by at least one of the following factors of screen resolution, user preference, and computer application using the system.

In one embodiment, the local region may be of circular shape.

The system may comprise means to assign a unique index to each of the potential selectable targets within the ROI. The ordering the potential selectable targets may be determined by one or more factors selected from a group including initial movement direction of the finger in contact with the touch screen, sizes of the potential selectable targets, shapes of the potential selectable targets, distances of the potential selectable targets from a reference point or the reference point, and structural information extracted from the potential selectable targets. The ordering of the potential selectable targets may be determined by other information extracted from the potential selectable targets The system may comprise means for mapping moving distance of the point of touch by the finger to a unique index of one potential selectable target.

The potential selectable target ordering means may include means for keeping track of information of movement or motion of the user's finger on the touch screen, the information including position information, moving direction information and moving speed information of the finger. The mapping may be a mapping such that with any distance of the point of touch, only one potential selectable target is focused, and thus selectable. The mapping may be defined by sufficiently large distance interval for each potential selectable target, allowing the user to focus on only one of the potential selectable targets at a time during a finger dragging operation. The distance intervals for all of the potential selectable targets may be the same. Alternatively, the distance intervals for the potential selectable targets may be different, allowing some of the potential selectable targets be focused more efficiently.

In the system, moving distance of the finger on the touch screen may be defined by a distance between current touch point and first touch point of the finger.

In the system, moving distance of the finger on the touch screen may be defined by a distance between current touch point and first touch point, but projected in initial direction of the finger.

In the system, selection of the desired target may be effected, when the desired target is focused, by releasing the finger off the touch screen. The system may comprise means for performing predefined operations, the operations including activating a context menu and displaying information of the desired target having been selected.

The system may further comprise means for visual magnification of the ROI for better visual feedback. Size of display of the local region may be determined by ratio of magnification of the visual magnification means.

The system may comprise means for cancellation of target selection, the cancellation means is effected by way of moving the finger in a direction substantially orthogonal to initial moving direction of order of the finger contacting the touch screen.

The system may comprise means for cancellation of target selection, the cancellation means is effected by tapping on any location of the touch screen within a predefined period of time.

BRIEF DESCRIPTION OF DRAWINGS

Some embodiments of the present invention will now be explained, with reference to the accompanied drawings, in which:

FIG. 1 shows by way of example non-uniform target distributions in user interface of a digital device, in which: FIG. 1a is a map application showing, among other targets, restaurants and stations; FIG. 1b shows menus and tool icons in a text editor; FIG. 1c shows crowds of characters in an online game; and FIG. 1d shows words and characters of a document in a text editor;

FIG. 2 shows the operation of an embodiment a target acquisition system of the present invention called, hereinafter called LinearDragger, in which: FIG. 2a shows a clustered group of selectable objects; FIG. 2b shows activation of the LinearDragger; FIG. 2c shows operation when user continues dragging his/her finger; and FIG. 2d shows selection of a target after the target has been focused;

FIG. 3 shows operation of the LinearDragger, in which: FIG. 3a. shows dragging the finger in any direction to activate LinearDragger; FIG. 3b shows a zoomed region of interest (ROI) within the screen; FIG. 3c shows cancellation of selection of a target and dismissal of the LinearDragger;

FIG. 4 shows two embodiments of mapping function for mapping finger dragging motion to the to the scanning speed of the potential targets, in which: FIG. 4a shows a first embodiment with linear mapping with constant effective width; and FIG. 4b shows non-linear mapping with larger effective widths to targets closer to an initial contact point;

FIG. 5 shows cluster placements for different operation modes; in which: FIG. 5a shows a bimanual mode; FIG. 5b shows a unimanual mode; and FIG. 5c is an illustration of the Shift system; and FIG. 5d is an illustration of the Escape system;

DETAILED DESCRIPTION OF EMBODIMENTS OF THE INVENTION

In order to illustrate the present invention, and to illustrate it by way of comparison, some conventional target acquisition systems are firstly explained. The below illustration makes reference to references listed at the end of the description, and the references are labelled with numbered from 1 to 25.

Figure 1:
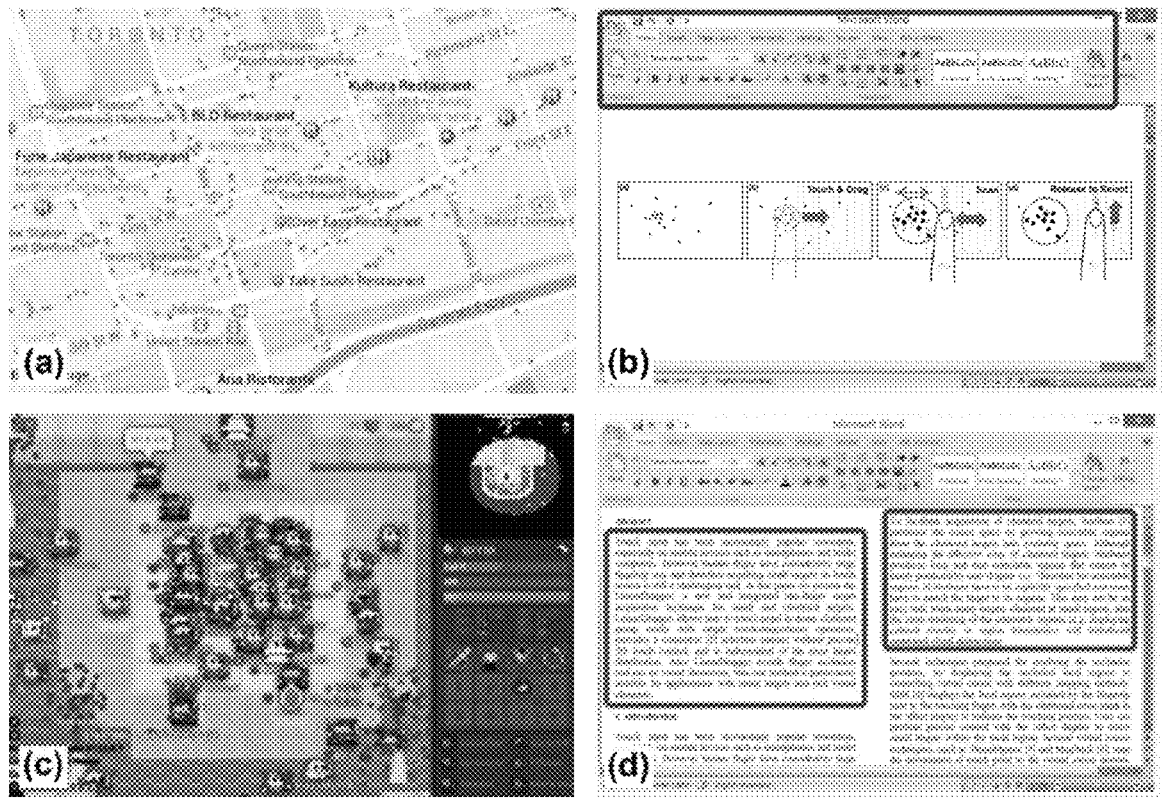

There are several techniques which had been introduced to address input precision and occlusion problems in acquiring small targets in touch screen interface of electronic devices. In Grossman et al and Parker et al [9, 18], there is taught partitions of the entire screen space into tiles of selection regions using Voronoi tessellation, to ease small target acquisition. Although this method has been proven helpful in a sparse target layout, it shows little effect when the targets are clustered as there is no space to extend. Unfortunately, clustering of targets appears in many applications, such as selectable items in an on-line map (see FIG. 1a), clustered UI elements of a text editor (see FIG. 1b), crowds of characters in an online game (FIG. 1c), and words and characters of document being selectable targets in a text editor (FIG. 1d). To facilitate acquisition of clustered targets, Käser et al illustrates Starburst [2] partitioning the screen space by expanding clustered targets to form selectable regions. However, this often produces long and thin selectable regions, which presents difficulty to user in acquiring them. Yatani et al illustrates Escape [25] adopting both the contact positions and swiping directions to disambiguate the selection of targets in dense clusters. However, both these approaches require auxiliary visual elements as visual cues for target selection, leading to undesired visual distraction and potentially degraded performance in extremely dense target distributions (e.g., characters in a text document).

Several other techniques seek address the occlusion problem either by displaying the occluded local region or controlling the virtual cursor with different mapping methods. Vogel et al illustrates Shift [23] displaying the local region occluded by the fingertip in a nearby empty space. The user may perform a precise control in the offset display to select small targets within the local region. Several virtual cursor techniques as taught in Potter et al, Sears et al, Karlson et al and Roudaut et al [20, 22, 11, 21] show mapping the movement of the contact point to the virtual cursor motion, such that the user may control the cursor and select the desired target without occluding the target region. However all these techniques still require precise two-dimensional (2D) touch control when working with small and clustered targets.

Figure 2:
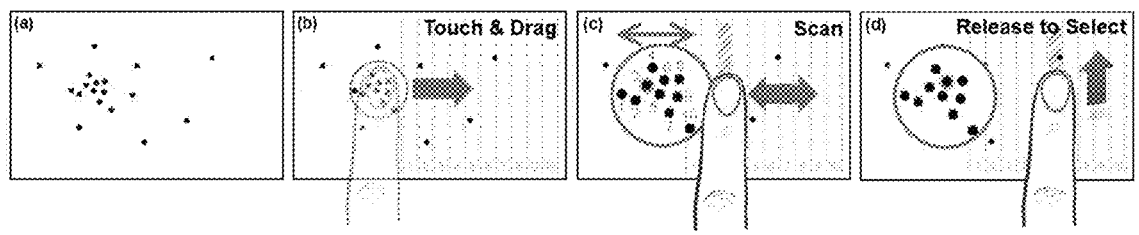

The present invention is concerned with novel target acquisition system, named LinearDragger, which is an integrated one-finger target acquisition technique for small and clustered targets. Besides using only the contact point to determine the selected target, LinearDragger allows the user to select a target in a dense clustered group easily with a single touch-drag-release operation without the need to accurately point to the desired target. If the first contact point can unambiguously identify a single target, the user just lifts the contact finger to select the target, i.e., select by tapping. However if there are multiple items within the local region around the contact point, the user could simple drag the finger to explore and select the desired target as shown in FIG. 2. All potential targets within the local region are ordered according to the finger moving direction, and are associated with effective regions of equal width. This converts the 2D selection problem into a 1D one, removing the need for precise 2D touch control. Hence, LinearDragger is independent of target distribution. In addition, as it does not have finger occlusion and introduces no auxiliary visual elements, it causes no visual distraction to the user. Thus, the proposed method is particularly suitable for applications with dense targets and rich visual elements. User study was conducted to evaluate the performance of LinearDragger under different conditions, and it was found that when selecting small targets, LinearDragger performs faster than Escape and Shift while having similar error rates.

Target Expansion

Target expansion is a common approach to facilitate small target acquisition with a pointing device. Methods of this approach are taught in Worden et al and Blanch et al [24, 5]. These methods adopt dynamic control-display ratio. Grossman et al, Moscovich et al and Chapuis [9, 15, 6] teach different systems which can increase the target's effective width by applying an area cursor. Cutwin et al and Pietriga et al [10, 19] are alternatives which are based on zooming in the visual space.

On a touch screen, target expansion techniques as illustrated in Parker et al and Baudisch et al [18, 2] enlarge the effective sizes of small targets by partitioning the screen space into tiles with each tile corresponding to a single target. The user may click anywhere inside a tile to select a target. In Parker et al [18], Voronoi tessellation is used for screen partitioning such that the nearest target from the contact point is always selected. However, the performance of this approach is highly dependent on the distribution of the targets, with small tiles for clustered targets. This makes it difficult to acquire small targets. Starburst illustrated in Baudisch et al [2] partitions the screen space by extending the tiles of all clustered targets from the cluster to the surrounding empty space, resulting in thin and lengthy pathways. Hence, the selectable regions of Starburst have to be explicitly specified and the user has to visually trace the region of the target. This may not be an easy task when many targets are clustered in a tight area. In addition, the display of the selectable regions, drawn as colored overlay or region boundaries, introduces undesired visual distractions.

Zooming is another common approach in expanding the target sizes for easier exploration and selection. As taught in Benko et al [3], a precise pointing technique with two-handed interaction is proposed. With a secondary finger to help adjust the level of magnification, the primary finger may perform precise selection in the zoomed region. Similarly, as taught in Olwal et al [16], a bimanual zooming method is proposed, with zooming being operated by tapping with a secondary finger. A multitouch technique called FingerGlass is introduced by Käser et al [12], in which the user defines a local region with the first two contact fingers and the magnified local region is popped up for precise selection using the second hand. Although all these methods provide intuitive interaction, two-handed operation is not practical in many situations, such as working with a handheld device.

There are also zooming techniques that involve only single-finger interactions. In Olwal et al [16], a rubbing gesture is introduced for zooming, which can be integrated with the panning operation using only a single finger. In Roudant et al [21], a two-stage selection method is proposed. The user first taps on the screen to popup a magnified viewport of the local area, and then taps again to select the target within this viewport. Excentric Labeling as illustrated in Fekete et al [7] is a technique to label a neighborhood of objects around the cursor, in a layout comfortable for human eyes. It can be transformed to a target acquisition technique using hierarchical operations. The main drawback of these techniques is that zooming and target selection have to be performed in separated steps. In contrast, LinearDragger of the present invention integrates zooming and target selection into a single one-finger operation and single touch action, which reduces operation complexity and is applicable in almost all selection scenarios. By single touch action, it means the action requires the finger to stay in contact on the screen during a particular task. An action of contacting a screen with a fingertip and then dragging the fingertip across a distance is a single touch action; a double tapping on the screen with a fingertip is not a single touch action.

Occlusion Avoidance

Occlusion is a common problem of touch screen interactions—due to the size of the finger tip, selectable objects can be easily occluded by the contact finger during target selection. The Offset Cursor technique as illustrated in Potter et al [20] is one of the earlier notable works to address this problem. It places a displaced cursor above the actual contact point, and the item under the cursor is selected when the user releases the finger. In Sears et al [22], a stabilization technique is proposed for the Offset Cursor to provide faster and more accurate selection of small targets. However, the main drawbacks of Offset Cursor are that the precise cursor position is unknown until the finger touches the screen and it is not possible to select targets at the bottom of the screen since the offset position is always above the finger. In Vogel et al [23], an improved technique, called Shift, is introduced. It displays a copy of the local region occluded by the finger at a nearby position. The selection hotspot remains under the fingertip. The user may select any small object under the finger while watching the offset display. Results of the user study show that Shift is more accurate than traditional finger selection on small targets and faster than the original Offset Cursor on larger targets.

There are other virtual cursor techniques that involve complex mapping between finger gesture and cursor motion. In Benko et al [3], an offset cursor located at the midpoint of two contact fingers is proposed. In Roudaut et al [21], an occlusion avoidance method called MagStick is proposed. The user presses an arbitrary position on the screen to define a reference point and a virtual cursor. The virtual cursor will then be controlled by the dragging motion of the contact finger, such that the cursor motion is opposite to the dragging motion with respect to the reference point. In Parker et al [18], a snap-to-target technique is applied to the virtual cursor to increase the target sizes in motion space. Thumbspace as illustrated in Karlson et al [11] is a technique to allow the user to reach a large screen space from a small input area using the thumb. It maps the input area to the whole screen and magnifies the user's finger motion in the input area to the mapped screen. Although ThumbSpace and MagStick resolve the occlusion problem, similar to the Offset Cursor, they require precise two-dimensional (2D) touch control to acquire small targets.

Precision Refinement

Another problem of touch screen interactions is that the human finger has limited precision due to the fat fingertip. In order to acquire dense and small targets, precision refinement methods are proposed to ease target selection. In Albinsson et al [1], Cross-Lever and Precision-Handle are introduced to increase the motion space of the virtual cursor on the touch screen. Cross-Lever involves controlling the intersection point between two crossed lines. It provides high precision control but is time consuming to use. Precision-Handle involves mapping a faction of the contact finger motion to the virtual cursor, thus enlarging the motor space and increasing the selection precision. Both techniques require separate operation steps for region selection, precise handle control and selection validation, which could potentially degrade selection performance and user experience.

In Yatani et al [25], a precision refinement technique called Escape is proposed. It allows user to select targets by swiping gestures, cued by both the target position and appearance. By swiping the fingertip in one of the predefined directions, the closest object specified with this swiping direction will be selected. In Moscovich et al [14], the swiping gesture is applied to touch screen widgets to resolve ambiguity by assigning different swiping directions to adjacent widgets. The Enhanced Area Cursor as illustrated in Findlater et al [8] allows the user to first specify a coarse area and then selects the desired target within the area by invoking an angular menu with swiping gesture. However as these techniques have limited possible swiping orientations, ambiguity in swiping directions may not be completely avoided in cases of extreme dense target distributions. The swiping directions are further limited for targets near to the boundary of the screen, as the swiping gesture cannot go beyond the edge of the screen. To indicate the swiping directions of all selectable objects, a special color scheme and icon design are introduced. However, this leads to visual distractions and limits the usage of customized symbols and labels, such as the map application shown in FIG. 1a. SQUAD as illustrated in Kopper et al is a progressive refinement technique for target acquisition in a 3D space. It resolves the problems of dense targets and occlusion in 3D target selection by applying a sequence of refinement operations to filter out the unwanted targets.

With the background of the various target acquisition systems and the main difference between the present invention with these system in mind, the following now describes the design of different embodiments of LinearDragger of the present invention, and the implementation details.

LinearDragger is activated by dragging the finger away in any direction from the user's specified initial region (see FIG. 2). A region of interest (ROI) is defined as the user's finger first touches the screen. In one embodiment, the ROI is pre-defined as a circular area, with the center being the first contact point of the finger. The radius of the ROI is programmable and adjustable and its optimized value depends on the screen size and the average size of the fingertips of the user group. All selectable targets within the ROI are considered as the set of potential selectable targets. For the purpose of illustration, it is considered that one of these targets is the user's desired target.

FIG. 2 is an overview of LinearDragger. FIG. 2a shows that it is difficult to select a target from a clustered group of selectable objects. FIG. 2b shows LinearDragger of the present invention is activated when the finger touches and drags on the touch screen. The contact position defines a region of interest (ROI), containing the user's desired target. FIG. 2c shows that as the user continues dragging his finger, LinearDragger scans the potential targets within the ROI one by one. At any one time, only one potential targets is focused, as shown in a highlighted target among the potential selectable targets. The scanning order is determined by the initial dragging direction. FIG. 2d shows that the user simply lifts the finger to effect selection the desired target.

The user drags the finger to linearly scan (and highlight) the potential targets one by one (see FIG. 2b). The order of scanning is determined by the moving direction of the contact finger. It starts from the opposite end and scans along the direction of the finger motion, as the user keeps dragging the finger away from the first contact point (see FIG. 2c). The user may select a highlighted target anytime by lifting the contact finger up (see FIG. 2d). Zooming of the ROI is invoked as the finger drags and leaves the ROI. This facilitates better visual feedback with small targets. To minimize visual distraction and avoid unnecessary focus switching, all the visual elements about the activation areas in FIGS. 2, 3 and 4 (i.e., the dashed lines, the shaded region and numbers) are for illustration purpose only; they are not shown on the screen.

The distance between the current position and the first contact point of the contact finger determines which of the potential targets is focused and highlighted. This essentially defines a uniform one-dimensional (1D) mapping between the ordered list of potential targets and the moving distance of the contact finger from the first contact point. The user may intuitively scan through the potential targets one by one by dragging the contact finger in the scanning orientation. This 1D mapping provides a constant effective width for all potential targets and avoids the need for precise selection in a two-dimensional (2D) space, which is required by methods such as MagStick as illustrated in Roudat et al [21] and ThumbSpace as illustrated Karlson et al [11].

The user is free to move the contact finger in any direction to activate LinearDragger. The moving direction may depend on the user's preference or the location of the ROI on the screen. This allows the user to select any targets on the screen, including those located near to the boundary/corner of the screen (see FIG. 3b).

FIG. 3a shows the user dragging the finger in any direction to activate LinearDragger. FIG. 3b shows the zoomed ROI located within the screen, even when/if the original ROI may be located near to the screen boundary. FIG. 3c shows the user cancelling the selection and dismiss LinearDragger by moving the finger in the orthogonal direction to the original dragging direction.

As shown above, LinearDragger has the following characteristics.

Single-handed one-finger interaction—LinearDragger only requires one finger to operate, which is perfectly suitable for use in a small mobile device being held by one hand and operated with a single finger.

Single action—It combines activation, selection and dismissal into a single touch action.

Intuitive to use—By remapping the potential targets into a linear list, it provides a simple 1D selection paradigm.

Insensitive to target distributions—The targets' effective widths are independent on target density and distribution. The user can easily acquire small and clustered targets without precise operation.

No finger occlusion—The contact finger always drags away from the ROI, and hence no finger occlusion occurs.

No visual distraction—It does not introduce any visual distraction as no extra widgets/elements are shown. (Note that the zoomed ROI may possibly lead to visual distraction, but this zooming feature is optional and does not affect the selection operation of LinearDragger.)

Adaptable to different screen sizes—LinearDragger can be operated with any finger and different device holding gestures. Thus, it is applicable to large tablets or even wall-sized touch screens.

Cancellation Mechanisms

Two different mechanisms are provided for the user to dismiss LinearDragger and to cancel the selection. A first mechanism adopts an additional waiting step after the user has selected a potential target by lifting the contact finger. Within the waiting period, the user may tap the screen at any location to cancel the selection and dismiss the focusing ROI. Studies show that the additional waiting period of substantially one second is long enough for the user to confirm the selected target or to cancel the selection if necessary, although the waiting time can be specified according to user preference. However, this additional waiting period and tapping step introduces extra user interaction and longer operation time.

A second cancellation mechanism is provided and only requires a simple step to cancel the selection. After LinearDragger is activated, the user may cancel the selection and dismiss LinearDragger by moving the contact finger roughly in the orthogonal direction to the original dragging direction (see FIG. 3c). This design retains the feature of a simple touch-drag-release interaction.

Studies have been conducted to test the user efficiency of these cancellation mechanisms. Results show that the orthogonal dragging method generally gives better performance.

Integration with Target Expansion Techniques

The present invention may be used in combination with or applied in some existing target acquisition system. LinearDragger can be easily integrated to existing target expansion techniques. Experiments show that LinearDragger can be integrated into snap-to-target approach of the Bubble cursor as illustrated in Grossman et al [9], which continuously sets the selection focus to the target closest to the cursor location. This approach effectively partitions the screen space using Voronoi tessellation.

One embodiment of the present invention adopts the Bubble Cursor approach such that for sparse regions, the user may directly select a target by tapping on it or the nearby space without ambiguity. For dense regions, the user may activate LinearDragger to help select a target by a simple dragging operation.

Implementation

LinearDragger maps the one-dimensional (1D) movement of the contact finger to the focus switching of the potential targets. This is the key for the user to efficiently access all potential targets in the ROI with intuitive and controllable input. We have experimented two different mapping functions in our implementation. The first one uses a constant effective width, as described before. This is based on the assumption that all potential targets are equally important. The second one uses a linearly scaled effective width. It is based on the assumption that a potential target nearer to the first contact point is more likely to be the intended target.

Figure 3:
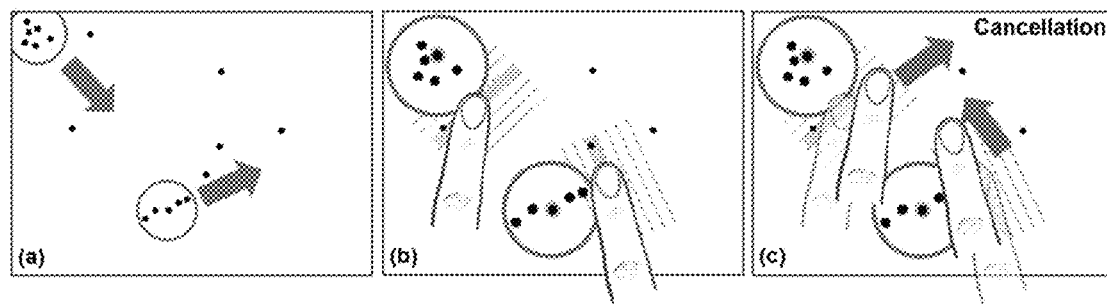

The first mapping function uses a constant effective width, as shown in FIGS. 2 and 3. It allows easy control in target scanning. Specifically, it is formulated as:

$$k = \begin{cases} \lfloor (d - d_{min})/EW_{base} \rfloor + 1, & \text{if } d > d_{min} \\ 1, & \text{otherwise} \end{cases} \quad (1)$$

where k is the 1-based index of the current focused target. d is the projected distance from the current contact point to the first contact point. $d_{min}$ is the minimal distance threshold. $EW_{base}$ is the predefined effective width (see FIG. 4a). The projected distance is defined as $d = (p - p_0) \cdot v$, where p and $p_0$ are the positions of the current contact point and the first contact point, respectively, and v is the normalized vector of the initial moving direction computed from the first few finger movement samples. The threshold distance, $d_{min}$, controls how long the finger should be dragged before the scanning is started, and depends on the size of the finger since the contact finger should not occlude the ROI during scanning and selection. In our experiments, we set $d_{min}=100$ pixels (about 13.5 mm) for the main testing device, as this size is close to the average size of the finger tip.

The constant effective width gives a more predictable control. However, users may sometimes prefer the targets closer to the first contact point to be selected easier than others in the ROI. Hence, in an alternative embodiment, there is provided the linearly scaled effective width, which associates different effective widths to different potential targets, with targets closer to the first contact point having larger effective widths, i.e., easier to be selected. Specifically, an extra expansion is added to the effective width of each target, such that the closest target received the maximum expansion of $EW_{ex}$, and the expansion reduces linearly along the two sides of the ordered list (see FIG. 4b).

Studies have been conducted to evaluate how these two mapping mechanisms or methods affect the performance of LinearDragger. Results have shown that the constant effective width generally gives better performance and all participants prefer this mapping method because of its predictable control. Since the activation areas were hidden during experiment with no visualization support, users found it difficult to perform selection and were confused by the non-uniform size of activation areas with the linearly scaled mapping method.

Figure 4:
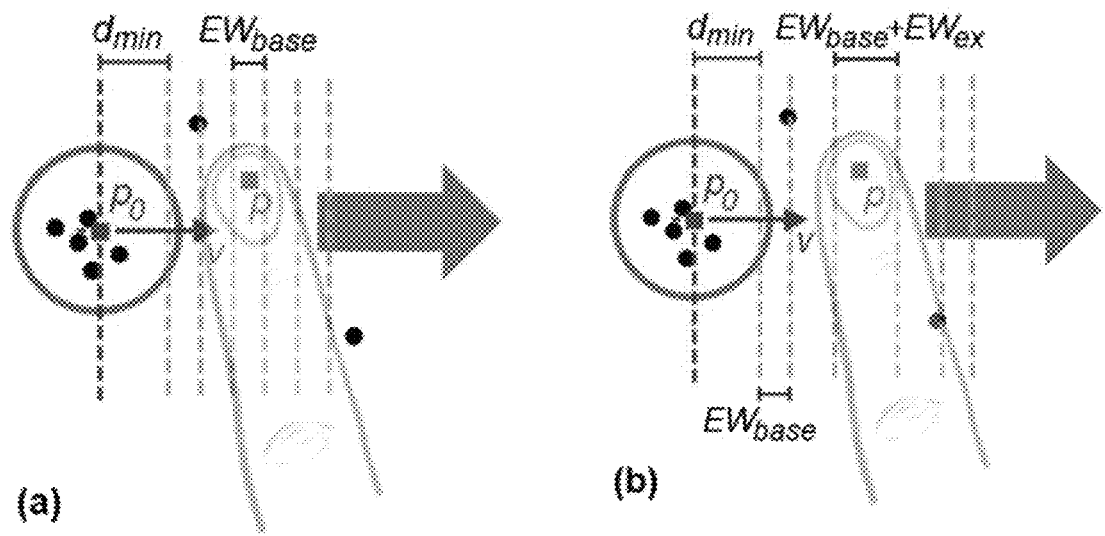

FIG. 4 shows two mapping functions for mapping the finger motion to the scanning speed of the potential targets. FIG. 4a shows linear mapping with constant effective width, and FIG. 4b shows non-linear mapping that gives larger effective widths to targets closer to the initial contact point.

To facilitate better visual feedback, a local expansion in the visual space of the ROI may be provided as an option. Please see FIGS. 2 and 3. The ratio of zooming is controlled by distance d (see below Eq. 1), such that the magnified region will occupy the empty space between the current finger location and the original ROI. Specifically, the zooming ratio r is defined as:

$$\tilde{r} = \begin{cases} (d - d_{min})/s + 1, & \text{if } d > d_{min} \\ 1, & \text{otherwise} \end{cases} \quad (2)$$

$$r = \min(\tilde{r}, r_{max}) \quad (3)$$

where s determines the speed of zooming. $r_{max}$ is the maximum zooming ratio. In our experiments, we set $r_{max}=2.5$ and $s=d_{min}$.

If the orthogonal dragging method is adopted for cancellation of the selection, we need to determine when the user moves the contact finger in the orthogonal direction to the original dragging direction. Comparison was made on the magnitude of the orthogonal component of the movement vector with the pre-specified threshold: $|(p-p_0) \times v| > \tau$. In all our experiments, we set $\tau=50$ pixels (or 6.75 mm).

Experiments

Experiment 1: Size of the ROI

Before comparing LinearDragger with other touch-based target acquisition techniques, studies were conducted to evaluate how the size of the ROI affects the performance of the proposed method.

Apparatus

The experiment was conducted on an Acer W3-810 tablet computer, with an 8.1" (20.6 cm) touch screen running MS Windows 8. The screen is of 17.5 cm×11 cm and has a resolution of 1280×800 (73.6 pixels/cm). Participants were free to hold the tablet in any way or to place it on a table. The experimental application was implemented using C# and .Net Framework, and displayed in full screen mode.

Participants

Eight participants (4 males and 4 females) between the age of 24 to 29 were recruited. They were mainly postgraduate students. All had experience with computers, touchscreen tablets and smart phones, and happened to be right handed. All participants were recruited from a university (recruitment posters were posted for open recruitment). Each of them was given a gift voucher of USD13 for participating in the user study.

Procedure and Design

At the beginning of the task, a button of 2 cm×2 cm was displayed at the middle-right of the screen. Once the participant tapped the button, 12 circular candidate targets of 12 pixels (1.6 mm) in diameter were distributed randomly within a circular region of 100 pixels (13.5 mm) in diameter, such that no targets overlap each other. In each task, participants were asked to select the desired target among the candidate targets as accurate and fast as possible. The desired target is highlighted in blue, while other candidate targets are filled in black color. Besides having the clustered targets within the circular region, 20 distracter targets of the same size as the clustered targets were placed randomly in the remaining empty space (FIG. 5a). Each participant performed the experiment in two separate sessions. One session was divided into two ROI size configurations: 26 and 40 pixels (or 3.6 mm and 5.4 mm) in diameter. Another session was divided into three ROI size configurations: 52, 66 and 80 pixels (or 7.2 mm, 9.0 mm and 10.8 mm) in diameter. For each ROI size configuration, each participant was asked to perform fifty selection tasks. Each participant spent approximately one hour in total on the two sessions.

The sizes of the ROI were chosen based on the finding by [17] that objects should be at least 9.2 mm×9.2 mm in size in order to keep the selection error rates low. Hence, a ROI with a similar reference size (9 mm in diameter) was adopted, plus a larger size and three smaller sizes (40% to 120% of the reference) in this experiment.

The duration between the user tapping the start button and when the target selection task was completed was recorded. The participants were allowed to use the orthogonal dragging mechanism to cancel a selection process. If a participant selected a wrong target or cancelled the selection before selecting the desired target, the task would be restarted until the correct target was selected and the recorded time would be accumulated. Before the experiment, we explained the details of the procedure and gave the participant a short duration of 5 to 10 minutes to get familiar with the interface. A total of 8×5×50=2,000 selection tasks were performed in this experiment, with each participant completed 250 tasks.

Results

When the size of the ROI is set to 26, 40, 52, 66, and 80 pixels (3.6/5.4/7.2/9.0/10.8 mm), the mean selection times were 3180 ms, 2740 ms, 2280 ms, 3230 ms, and 3520 ms, and the corresponding error rates were 12.1%, 9.3%, 4.6%, 11.3% and 13.7%, respectively. There was a significant effect on the mean selection time ($F_{(4,28)}=25.32$, $p<0.001$) and the error rate ($F_{(4,28)}=5.71$, $p<0.001$).

Discussion

It is observed that both the selection time and the error rate are at the minimum when the size of the ROI is 52 pixels. This may due to the fact that a larger ROI size leads to more targets being included in the scanning. Thus, participants needed to look through more candidate targets, resulting in a longer selection time and a larger error rate. On the other hand, if the size of the ROI is too small, it is much harder for the participants to specify the ROI so as to include the desired target. Hence, the participants needed to redo the selection, which affected the overall performance. As such, we fixed the size of the ROI to 52 pixels (7.2 mm) for the remaining experiments presented in the paper, unless specified otherwise.

Experiment 2: Cancellation Mechanism

We also conducted another preliminary study to evaluate the two proposed cancellation mechanisms. Note that the diameter of the ROI was set to 52 pixels (7.2 mm) as stated in preliminary study 1.

Apparatus and Participants

Same as those in preliminary Experiment 1.

Procedure and Design

Participants were asked to perform two different types of tasks in this experiment.

In the first session, the selection performance of both cancellation mechanisms was evaluated. The same selection task as described in Experiment 1 was used. The participants were asked to select the desired targets using the specified cancellation mechanisms. It is to be noted that in the orthogonal dragging mechanism, only a single touch-drag-release operation is used for selection, while for the other mechanism, an additional waiting time is needed to validate the selection. Each participant performed two groups of 50 selection tasks in one session, each group using one cancellation mechanism.

The second session of the experiment is to evaluate the accuracy of the cancellation mechanisms. With the same setting as the first session, we asked the participants to cancel the selection with the specified cancellation method after focusing on the desired target. (Hence, the task was completed if the desired target was the last highlighted target before the cancellation was performed.) The whole experiment lasted for about an hour and as in preliminary study 1, after the detailed explanation provided in each session, participants could practice for a short duration. In this experiment, a total of 8×2×50=800 selection tasks and 8×2×50=800 cancellation tasks were performed. The completion times of all selection tasks and successful rates of the cancellation tasks were recorded.

Results

Experimental results show that the mean selection time using Orthogonal Dragging was 2310 ms with a cancellation accuracy of 97.5%, while the mean selection time using Additional Tap was 3400 ms with a cancellation accuracy of 99.4%. Repeated measures analysis of variance shows that different cancellation mechanisms have significant effect on selection time ($F_{(1,7)}=15.30$, $p<0.001$)) but no significant effect on cancellation accuracy.

Discussion

It is shown that using Additional Tap was slower than using Orthogonal Dragging by around 1 s for the target selecting tasks. This was mainly caused by the extra waiting time needed for the system to validate the target selection. Because of their similar accuracy but different performances, Orthogonal Dragging is a preferred mechanism as the cancellation mechanism in LinearDragger.

Experiment 3 (Main Experiment): Performance Comparison

After determining the size of the ROI and the cancellation mechanism, a main experiment was conducted to quantitatively evaluate the performance of LinearDragger of the present invention. We compared it with unaided touch pointing DirectTouch, which served as a baseline, the Bubble Cursor as illustrated in Grossman et al [9], which is a common target expansion approach for selecting small targets, Shift illustrated in Vogel et al [23] and Escape illustrated in Yatani et al [25], which are two alternative single-touch target selection techniques supporting high precision selection.

One main reason for selecting Shift, Escape and Bubble as the methods for comparison is that all three methods, like LinearDragger, involve only single touch-drag-release operation. It is to be noted that that when using Bubble on a touch input device, the user may drag the touching finger to highlight different targets (i.e., the target closest to the touch point), even though the highlighted target may be occluded by the touching finger. On the other hand, there are techniques that involve multiple operations, such as TapTap illustrated in Roudant et al [21], which involves separated zooming and selection operation and is shown to outperform Shift. Although it would be interesting to compare LinearDragger with this type of methods, the main focus of this user study is to evaluate the performance of the target selection methods using the same touch-drag-release operation, and we leave this issue as a future work.

To better evaluate the performance in different operating scenarios, the operation mode as one of the factors of the experiment was also introduced. Participants were instructed to use both hands (bimanual mode) or single hand (unimanual mode) to perform the selection tasks. Specifically, in bimanual mode, participants need to hold the device with the non-dominant hand and perform selection with the dominant hand.

In unimanual mode, participants need to hold the device and perform the tasks with the same hand. In both operation modes, participants were free to use any finger of the specified hand to complete the selection tasks.

Apparatus

Same as those in Experiments 1 and 2.

Participants

Twelve adult participants (8 females and 4 males) of age 24 to 29 were recruited. All participants happened to be right-handed and had experience in using computers, tablets and smart phones with touch screens. They were all recruited from a university (recruitment posters were posted for open recruitment). Each of them was given a gift voucher of USD13 for participating in the user study.

Procedure and Design

The same general procedure was followed as in Experiment 1. Participants were required to select the desired target highlighted in blue from a cluster of candidate targets. Parameter Count was used to control the total number of the clustered targets. The clustered targets were located within a circular region of 100 pixels (13.5 mm) in diameter, such that no targets overlapped each other. The circular region was placed at the center of the touchscreen in the bimanual mode (FIG. 5a) and at the bottom-right quarter (35 mm and 70 mm from the right and bottom edges, respectively) in the unimanual mode (FIG. 5b), in order to facilitate selection with the thumb of the holding hand. In addition, 20 distracter targets having the same size as the clustered targets were placed in the empty space outside the circular region.

The experiment was a 5×4×3×2 within-participant design with the following factors: (1) Five techniques TECH for comparison: LinearDragger, DirectTouch, Bubble, Escape and Shift. (2) Four target sizes Size: 6, 12, 18 and 24 pixels (0.8/1.6/2.4/3.2 mm). (3) Three numbers of clustered targets Count: 8, 12 and 16. (The maximum number of clustered targets was set to 16 because if too many targets were set into the clustered region of a diameter 13.6 mm, they would likely overlap and occlude each other.) (4) Two operation modes Mode: bimanual and unimanual.

Each participant performed the experiment in 2 sessions of different operation modes, each session was divided into 5 groups of different techniques. Each TECH group was further divided into 12 subgroups of different combinations of Size and Count. Within each subgroup, each participant needed to complete 20 selection tasks. In the experiment, Mode was counterbalanced, TECH (except DirectTouch) was ordered in a balanced Latin-square with DirectTouch always being used at the end, and the order of subgroups was randomized. A total of 28,800 selection tasks were included in the experiment. Similar to the preliminary studies, before using each operation mode and technique, participants were instructed and given a 5-10 minute warm-up session to get familiar with the technique and the tasks.

Shift as illustrated in Vogel et al [23] with the zero escalation time was implemented. This is because in each trial, all clustered targets were of the same small size (with a maximum size of 3.2 mm) packed within a small area. Hence, it was assumed that the pop-up of the occluded area was always needed by the participants. However, no refinement or correction of the touching position was used as we would like to provide a consistent touching point precision and control among all techniques including DirectTouch and Bubble, which are very sensitive to the touching positions. Escape as illustrated in Tantani et al [25] was implemented with 8-directional beak-shape targets. Note that unlike the original design in [25], we did not apply any color scheme as visual cues, as we would like to have a similar display complexity and style for all tested techniques. (All targets were in black with the desired target in blue.) FIG. 5c shows the pop-up local copy of the occluded area and FIG. 5d shows the same set of clustered targets with the beak-shape indicators. For LinearDragger, the size of the ROI was set to 52 pixels (7.2 mm) and to use the Orthogonal Dragging cancellation mechanism. In order to have a fair evaluation on LinearDragger, the target expansion feature (i.e., the Bubble cursor approach) was disabled in the main experiment.

Figure 5:
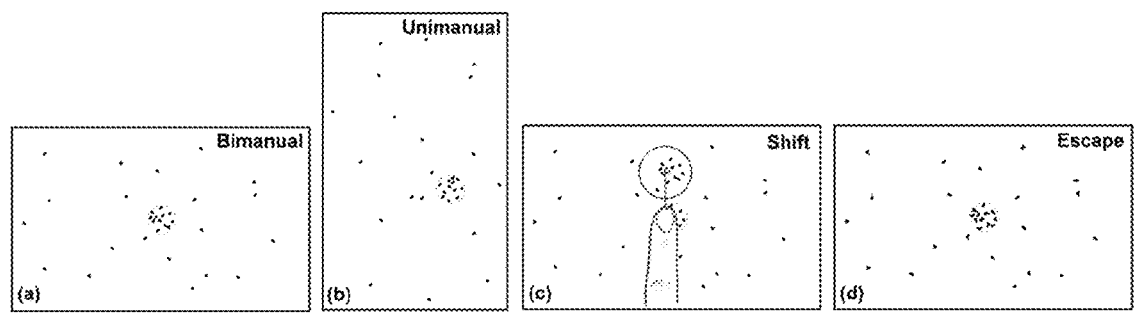

FIG. 5 show cluster placements for different operation modes. Specifically, FIG. 5a shows bimanual mode and FIG. 5b unimanual mode. Illustrations of the display style of two alternative selection techniques are shown in FIG. 5c Shift [23] and FIG. 5d Escape [25].

Figure 6:
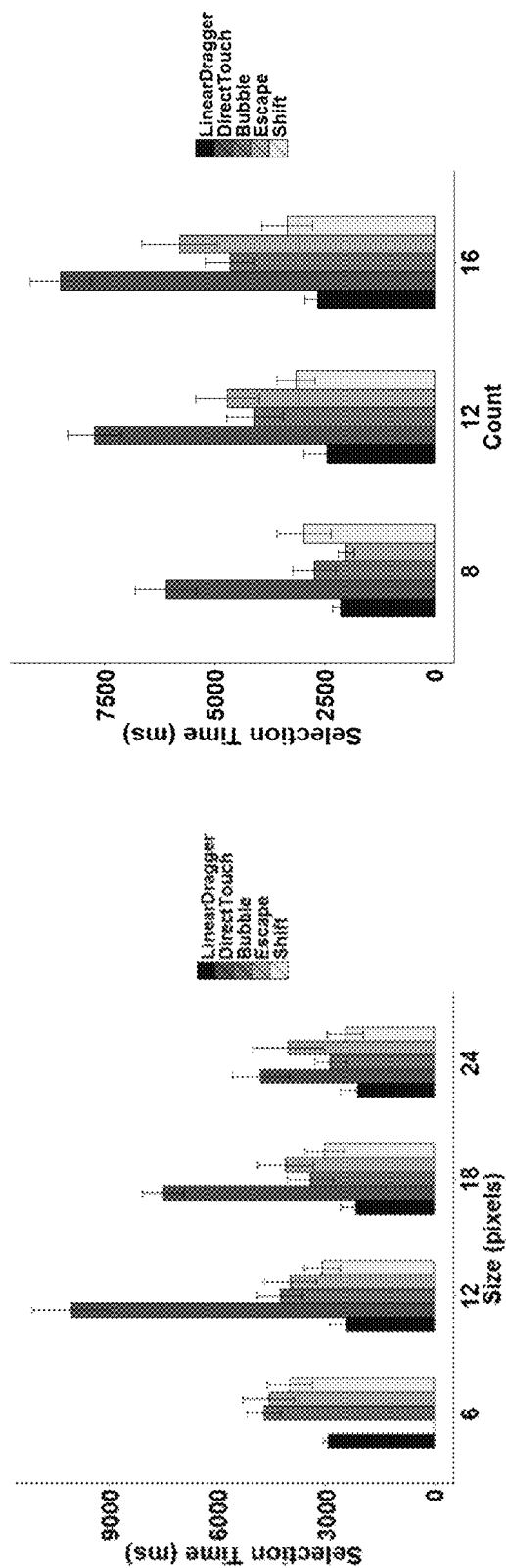
FIG. 6 shows comparison of selection times of different techniques including Linear Dragger grouped by size on left graph and by count on right graph for the bimanual mode.

FIG. 6 shows the selection times of different techniques grouped by Size (left) and Count (right), for the bimanual operation mode. The error bars are at the 95% confidential level.

Figure 7:
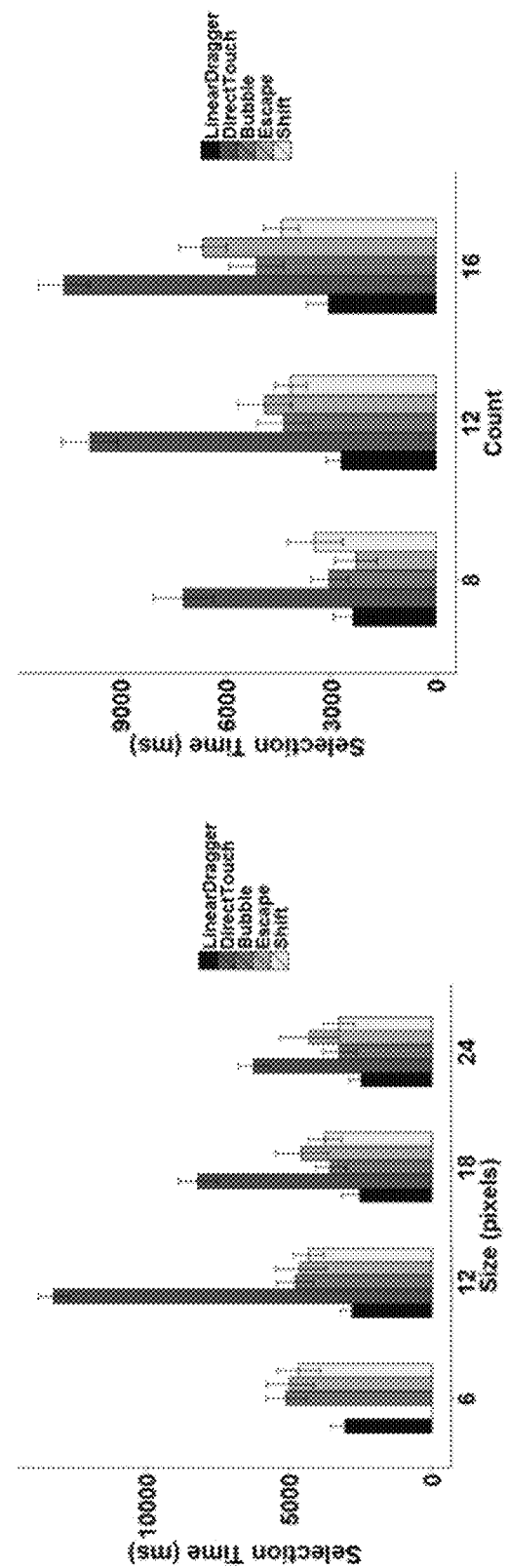
FIG. 7 shows comparison of selection times of different techniques including Linear Dragger grouped by size on left graph and by count on right graph for the unimanual operation mode.

FIG. 7 shows the selection times of different techniques grouped by Size (left) and Count (right), for the unimanual operation mode. The error bars are at the 95% confidential level.

Results

Selection Time

Repeated measures analysis shows a significant main effect for TECH ($F_{(4,44)}=32.4$, $p<0.0001$; $F_{(4,44)}=48.72$, $p<0.0001$), Size ($F_{(3,33)}=5.0$, $p=0.0022$; $F_{(3,33)}=7.91$, $p<0.0001$) and Count ($F_{(2,22)}=3.31$, $p=0.0481$; $F_{(2,22)}=3.35$, $p=0.0371$) on both bimanual and unimanual modes, respectively. The mean selection time was 2557 ms for LinearDragger, 8336 ms for DirectTouch, 3989 ms for Bubble, 4384 ms for Escape and 3574 ms for Shift. The following significant interactions are also observed: TECH×Size ($F_{(12,132)}=2.72$, $p=0.0021$; $F_{(12,132)}=2.68$, $p<0.0001$) and TECH×Count ($F_{(8,88)}=2.54$, $p=0.0113$; $F_{(8,88)}=2.30$, $p=0.0230$) for bimanual mode and unimanual mode, respectively.

FIGS. 6 and 7 show the mean selection times of different techniques grouped by Size and Count, using bimanual mode and unimanual mode, respectively. It is observed that LinearDragger had the shortest mean selection time in most of the cases. DirectTouch had the worst performance among all selection techniques, particularly when the target size was small. It is found that it was almost impossible for participants to select targets in size of 6 pixels (0.8 mm) using DirectTouch. Hence, we added a maximum movement time for each selection task (30 s in our setting) to ensure that participants could complete the sessions within a reasonable amount of time, and a task would be terminated if it could not be finish in time. Since more that 80% of the selection tasks using DirectTouch and with target size of 6 pixels (0.8 mm) could not be finished successfully in time, it was decided to skip this combination of DirectTouch in the computation of average movement time and error rate. This does not affect the overall evaluation as DirectTouch only served as the baseline in our experiment. To gain a thorough understanding of the measurement, the Tukey HSD post-hoc tests are conducted to evaluate the significance in the performance gaps. Post-hoc tests analysis the significance in the performance difference among different techniques. We present the post-hoc test result in the following manner. A technique, T1, has a rank higher than that of another technique, T2, if and only if the post-hoc test shows that T1 significantly outperforms T2 under the given scenario.

The post-hoc test result shown in Table 1 reveals that LinearDragger was significantly faster than all other methods, for target sizes smaller than 18 pixels (2.4 mm). When the target size was set to 24 pixels (3.2 mm), there was no significant difference in the mean selection time among LinearDragger, Bubble and Shift in the bimanual operation mode. The post-hoc test result shown in Table 2 reveals that both LinearDragger and Escape performed the best and were significantly faster than DirectTouch, Bubble and Shift when Count was set to 8, in both operation modes. However, the performance of Escape degraded dramatically when Count increased.

Error Rate

Repeated measures analysis of variance shows that the error rate was significantly affected by TECH ($F_{(4,44)}=8.31$, $p<0.0001$; $F_{(4,44)}=10.82$, $p<0.0001$) for bimanual mode and unimanual mode, respectively. The mean error rate was 7.2% for LinearDragger, 35.3% for DirectTouch, 8.5% for Bubble, 29.1% for Escape and 9.7% for Shift. The significant interactions TECH×Count ($F_{(8,88)}=5.42$, $p<0.0001$; $F_{(8,88)}=4.93$, $p<0.0001$) are also observed for bimanual and unimanual modes, respectively.

TABLE 1

Significant differences on mean selection time among TECH by Size, for bimanual (top) and unimanual (bottom) modes. Tukey HSD test ($\alpha = 0.05$)

| Mode | Size | Rank | | | | |
| --- | --- | --- | --- | --- | --- | --- |
| | | LG | DT | B | E | S |
| Bimanual | 6 | 1 | — | 3 | 3 | 2 |
| | 12 | 1 | 4 | 3 | 3 | 2 |
| | 18 | 1 | 4 | 2 | 3 | 2 |
| | 24 | 1 | 3 | 1 | 2 | 1 |
| Unimanual | 6 | 1 | — | 2 | 2 | 2 |
| | 12 | 1 | 3 | 2 | 2 | 2 |
| | 18 | 1 | 4 | 2 | 3 | 2 |
| | 24 | 1 | 4 | 2 | 3 | 2 |

LG = LinearDragger, DT = DirectTouch, B = Bubble, E = Escape, S = Shift

TABLE 2

Significant differences on mean selection time among TECH by Count, for bimanual (top) and unimanual (bottom) modes. Tukey HSD test ($\alpha = 0.05$)

| Mode | Count | Rank | | | | |
| --- | --- | --- | --- | --- | --- | --- |
| | | LG | DT | B | E | S |
| Bimanual | 8 | 1 | 3 | 2 | 1 | 2 |
| | 12 | 1 | 4 | 3 | 3 | 2 |
| | 16 | 1 | 4 | 3 | 3 | 2 |
| Unimanual | 8 | 1 | 3 | 2 | 1 | 2 |
| | 12 | 1 | 4 | 2 | 3 | 2 |
| | 16 | 1 | 5 | 3 | 4 | 2 |

LG = LinearDragger, DT = DirectTouch, B = Bubble, E = Escape, S = Shift

Discussion

By comparing FIGS. 6 and 7, we observe that target selection in unimanual mode took much more time than in bimanual mode. This can be easily explained as target selection using both hands provides stabler control over the device than using a single hand. Besides, this effect is especially significant for Shift since it requires precise touch control while other techniques (except DirectTouch) can tolerate a noisier touch input.

From the post-hoc test result shown in Table 1, we observe that the performance of Shift is correlated with the target size—when the target size increased, the selection time of Shift decreased significantly. This is due to the fact that the operation of Shift is similar to DirectTouch but without the occlusion problem. Thus, its performance is directly related to the effective size of the target.

From the post-hoc test result shown in Table 2, it is observed that Escape relies on assigning distinguishable swiping directions to the crowded targets. When Count becomes greater than the number of possible swiping directions, multiple targets in the cluster will be assigned with the same swiping direction, making them more difficult to be selected. On the other hand, as both DirectTouch and Bubble do not resolve the occlusion problem, they incurred a considerable amount of selection errors. As expected, the performance of Bubble degraded with dense target distributions, since the targets' effective areas become smaller in denser cluster and are more often occluded by the finger tip.

Qualitative Results

Participants were asked to rank the techniques by subjective preference in a post-hoc questionnaire. Eight participants ranked LinearDragger as their preferred technique, while four ranked Shift as their preferred technique and LinearDragger as second. Most participants commented that they liked Escape for Count less than 8 but not very helpful for larger cluster sizes.

Conclusion

This paper introduces LinearDragger, a new one-finger target acquisition technique for small and clustered targets. One novel contribution of the present invention is a mapping approach to convert the 2D targeting selection problem to a 1D selection problem, with a simple touch-drag-release operation. This novel technique gives constant effective width for all candidate targets, which is independent of the target distribution. This leads to a predictable and controllable selection interface. Results of our controlled experiments show that LinearDragger is a promising target acquisition technique for touch devices, and performs better than existing popular selection techniques that involve a single-touch operation, in terms of both selection time and error rate.

Results of our controlled experiments show that when selecting small targets, LinearDragger takes about 70% and 30% less selection time than target acquisition without using any techniques and with the state-of-the-art target acquisition technique that involves a single touch operation, respectively, while maintaining a reasonable error rate.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

A number of references are mentioned in the above description, and the contents thereof and the reference listed below are incorporated herein in their entirety.

REFERENCES

1. Albinsson, P.-A., and Zhai, S. High precision touch screen interaction. In *Proc. ACM SIGCHI* (2003), 105-112.
2. Baudisch, P., Zotov, A., Cutrell, E., and Hinckley, K. Starburst: a target expansion algorithm for non-uniform target distributions. In *Proc. Working Conference on Advanced Visual Interfaces* (2008), 129-137.
3. Benko, H., Wilson, A., and Baudisch, P. Precise selection techniques for multi-touch screens. In *Proc. ACM SIGCHI* (2006), 1263-1272.
4. Bi, X., Li, Y., and Zhai, S. Fitts law: Modeling finger touch with fitts' law. In *Proc. ACM SIGCHI* (2013), 1363-1372.
5. Blanch, R., Guiard, Y., and Beaudouin-Lafon, M. Semantic pointing: improving target acquisition with control-display ratio adaptation. In *Proc. ACM SIGCHI* (2004), 519-526.

6. Chapuis, O., Labrune, J.-B., and Pietriga, E. Dynaspot: speed-dependent area cursor. In *Proc. ACM SIGCHI* (2009), 1391-1400.
7. Fekete, J.-D., and Plaisant, C. Excentric labeling: Dynamic neighborhood labeling for data visualization. In *Proc. ACM SIGCHI* (1999), 512-519.
8. Findlater, L., Jansen, A., Shinohara, K., Dixon, M., Kamb, P., Rakita, J., and Wobbrock, J. Enhanced area cursors: reducing fine pointing demands for people with motor impairments. In *Proc. ACM UIST* (2010), 153-162.
9. Grossman, T., and Balakrishnan, R. The bubble cursor: enhancing target acquisition by dynamic resizing of the cursor's activation area. In *Proc. ACM SIGCHI* (2005), 281-290.
10. Gutwin, C. Improving focus targeting in interactive fisheye views. In *Proc. ACM SIGCHI* (2002), 267-274.
11. Karlson, A., and Bederson, B. Thumbspace: generalized one-handed input for touchscreen-based mobile devices. In *Proc. INTERACT*, Springer (2007), 324-338.
12. Käser, D., Agrawala, M., and Pauly, M. Fingerglass: efficient multiscale interaction on multitouch screens. In *Proc. ACM SIGCHI* (2011), 1601-1610.
13. Kopper, R., Bacim, F., and Bowman, D. Rapid and accurate 3D selection by progressive refinement. In *Proc. IEEE Symp. 3D User Interfaces* (2011), 67-74.
14. Moscovich, T. Contact area interaction with sliding widgets. In *Proc. ACM UIST* (2009), 13-22.
15. Moscovich, T., and Hughes, J. Multi-finger cursor techniques. In *Proc. Graphics Interface* (2006), 1-7.
16. Olwal, A., Feiner, S., and Heyman, S. Rubbing and tapping for precise and rapid selection on touch-screen displays. In *Proc. ACM SIGCHI* (2008), 295-304.
17. Parhi, P., Karlson, A., and Bederson, B. Target size study for one-handed thumb use on small touchscreen devices. In *Proc. MobileHCI* (2006), 203-210.
18. Parker, J., Mandryk, R., Nunes, M., and Inkpen, K. Improving target acquisition for pointing input on tabletop displays. In *Proc. INTERACT* (2005), 80-93.
19. Pietriga, E., and Appert, C. Sigma lenses: focus-context transitions combining space, time and translucence. In *Proc. ACM SIGCHI* (2008), 1343-1352.
20. Potter, R., Weldon, L., and Shneiderman, B. Improving the accuracy of touch screens: an experimental evaluation of three strategies. In *Proc. ACM SIGCHI* (1988), 27-32.
21. Roudaut, A., Huot, S., and Lecolinet, E. Taptap and magstick: improving one-handed target acquisition on small touch-screens. In *Proc. Working Conference on Advanced Visual Interfaces* (2008), 146-153.
22. Sears, A., and Shneiderman, B. High precision touchscreens: design strategies and comparisons with a mouse. *International Journal of Man-Machine Studies* 34, 4 (April 1991), 593-613.
23. Vogel, D., and Baudisch, P. Shift: a technique for operating pen-based interfaces using touch. In *Proc. ACM SIGCHI* (2007), 657-666.
24. Worden, A., Walker, N., Bharat, K., and Hudson, S. Making computers easier for older adults to use: area cursors and sticky icons. In *Proc. ACM SIGCHI* (1997), 266-271.
25. Yatani, K., Partridge, K., Bern, M., and Newman, M. Escape: a target selection technique using visually-cued gestures. In *Proc. ACM SIGCHI* (2008), 285-294.

The invention claimed is:

1. A target acquisition system for use in a touch screen graphical user interface for selecting a desired target from a plurality of potential selectable targets, comprising:—
    a) means for defining a local region of interest (ROI) of predefined shape and area;
    b) means for, on contact of a user's finger on the touch screen, allowing activation of the ROI;
    c) means for ordering the potential selectable targets within the ROI into a one-dimensional (1-D) ordered list;
    d) means for mapping movement of the finger on the touch screen; and
    e) means for selecting the desired target from the plurality of potential selectable targets;
    wherein the system is configured to allow operation of said defining in step a), said activation in step b), said ordering in step c), said mapping in step d) and said selection in step e) in a single touch action, and
    wherein the ordering of the potential selectable targets is determined by one or more factors selected from a group including initial movement direction of the finger in contact with the touch screen, sizes of the potential selectable targets, shapes of the potential selectable targets, distances of the potential selectable targets from a reference point or the reference point, and structural information extracted from the potential selectable targets.

2. A system as claimed in claim 1, comprising means, activation of which is triggered by the finger contacting the touch screen and dragging the finger on the touch screen.

3. A system as claimed in claim 1, wherein the ROI is defined by a first touch point by the finger.

4. A system as claimed in claim 3, wherein the first touch point is a reference point of the ROI.

5. A system as claimed in claim 3, wherein the ROI contains the plurality of potential selectable targets, and the potential selectable targets are visual elements in any location on the touch screen.

6. A system as claimed in claim 4, wherein the reference point is the center of the ROI.

7. A system as claimed in claim 1, wherein size of the ROI is determined by at least one or more factors including screen resolution, user preference, and computer application using the system.

8. A system as claimed in claim 1, wherein the ROI is of circular shape.

9. A system as claimed in claim 1, comprising means to assign a unique index to each of the potential selectable targets within the ROI.

10. A system as claimed in claim 1, wherein the ordering of the potential selectable targets is determined by other information extracted from the potential selectable targets.

11. A system as claimed in claim 1, comprising means for mapping moving distance of point of touch by the finger to a unique index of one potential selectable target.

12. A system as claimed in claim 1, wherein the potential selectable target ordering means includes means for keeping track of information of movement or motion of the user's finger on the touch screen, the information including position information, moving direction information and moving speed information of the finger.

13. A system as claimed in claim 11, wherein the mapping is a mapping such that with any moving distance of the point of touch, only one potential selectable target is focused, and thus selectable, at any one time.

14. A system as claimed in claim 13, wherein the mapping is defined by sufficiently large distance interval for each potential selectable target, allowing a user to focus on any one of the potential selectable targets in a finger dragging operation.

15. A system as claimed in claim 14, wherein the distance intervals for all of the potential selectable targets are the same.

16. A system as claimed in claim 14, wherein the distance intervals for the potential selectable targets are different, allowing some of the potential selectable targets to be focused more efficiently.

17. A system as claimed in claim 11, wherein the moving distance of the finger on the touch screen is defined by a distance between current touch point and first touch point of the finger.

18. A system as claimed in claim 11, wherein the moving distance of the finger on the touch screen is defined by distance between current touch point and first touch point, but projected in initial moving direction of the finger.

19. A system as claimed in claim 1, wherein selection of the desired target is effected, when the desired target is focused, by releasing the finger off the touch screen.

20. A system as claimed in claim 19, comprising means for performing predefined operations, said operations including activating a context menu and displaying information of the desired target having been selected.

21. A system as claimed in claim 1, comprising means for visual magnification of the ROI for better visual feedback.

22. A system as claimed in claim 21, wherein size of display of the ROI is determined by ratio of magnification of the visual magnification means.

23. A system as claimed in claim 1, comprising means for cancellation of target selection, the cancellation means is effected by way of moving the finger in a direction substantially orthogonal to initial moving direction of the finger.

24. A system as claimed in claim 1, comprising means for cancellation of target selection, the cancellation means is effected by tapping on any location of the touch screen within a predefined period of time.

\* \* \* \* \*